(12) United States Patent
Negishi et al.

(10) Patent No.: US 9,994,012 B2
(45) Date of Patent: Jun. 12, 2018

(54) INK JET RECORDING METHOD AND INK JET RECORDING APPARATUS

(71) Applicant: CANON KABUSHIKI KAISHA, Tokyo (JP)

(72) Inventors: Yuko Negishi, Tama (JP); Soichi Nagai, Kawasaki (JP); Tomohiro Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/170,297

(22) Filed: Jun. 1, 2016

(65) Prior Publication Data
US 2016/0355019 A1    Dec. 8, 2016

(30) Foreign Application Priority Data

Jun. 4, 2015  (JP) ................................. 2015-114030
Jun. 4, 2015  (JP) ................................. 2015-114031

(51) Int. Cl.
| | |
|---|---|
| *B41J 2/175* | (2006.01) |
| *B41J 2/01* | (2006.01) |
| *B41J 2/195* | (2006.01) |
| *B41J 2/045* | (2006.01) |
| *B41J 2/21* | (2006.01) |
| *C09D 11/322* | (2014.01) |

(52) U.S. Cl.
CPC ............. *B41J 2/01* (2013.01); *B41J 2/175* (2013.01); *B41J 2/17509* (2013.01); *B41J 2/195* (2013.01); *B41J 2/04563* (2013.01); *B41J 2/2107* (2013.01); *C09D 11/322* (2013.01)

(58) Field of Classification Search
CPC ... B41J 2/01; B41J 2/175; B41J 2/2107; B41J 2/04563; B41J 2/195; B41J 2/17509; C09D 11/322
See application file for complete search history.

(56) References Cited

U.S. PATENT DOCUMENTS

| | | | |
|---|---|---|---|
| 2002/0118242 A1* | 8/2002 | Tajima ................. | B41J 2/17556 347/17 |
| 2011/0050793 A1* | 3/2011 | Kumagai ................. | B41J 2/125 347/22 |
| 2012/0229554 A1* | 9/2012 | Goto .................... | B41J 2/14024 347/20 |

(Continued)

FOREIGN PATENT DOCUMENTS

| | | |
|---|---|---|
| CN | 102839553 A | 12/2012 |
| CN | 103786436 | 5/2014 |

(Continued)

*Primary Examiner* — Yaovi M Ameh
(74) *Attorney, Agent, or Firm* — Canon U.S.A. Inc., IP Division

(57) ABSTRACT

An ink jet recording method comprising ejecting an ink from a recording head to record an image on a recording medium using an ink jet recording apparatus. The ink jet recording apparatus includes a main tank having an air communication part, a sub tank, and a recording head. The ratio of the maximum ink storage amount of the main tank to the maximum ink storage amount of the sub tank is 3.0 or more to 50.0 or less. The temperature of the ink in the sub tank is higher than the temperature of the ink in the main tank. The ink contains a coloring material and a particular surfactant.

16 Claims, 2 Drawing Sheets

(56) References Cited

U.S. PATENT DOCUMENTS

| | | | | |
|---|---|---|---|---|
| 2012/0327156 | A1* | 12/2012 | Aruga | ............... B41J 3/4078 347/20 |
| 2013/0021406 | A1* | 1/2013 | Stoeva | ............ C08G 18/0823 347/20 |
| 2015/0085034 | A1* | 3/2015 | Aruga | ............... C09D 11/38 347/93 |

FOREIGN PATENT DOCUMENTS

| | | |
|---|---|---|
| CN | 104245860 A | 12/2014 |
| JP | 2003305872 A | 10/2003 |
| JP | 2004-083621 A | 3/2004 |
| JP | 2009-256599 A | 11/2009 |

* cited by examiner

US 9,994,012 B2

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Ink jet recording methods enable recording on various recording media. Various inks, for example, inks suitable for recording images of photographic quality on glossy paper and inks suitable for recording documents on plain paper, have been proposed for each use to improve image quality.

Ink jet recording methods have also been utilized to record business documents including text and graphics on plain paper and are becoming increasingly useful in such applications. With advances in ink jet recording methods, there are demands for improved durability and reliability in long-term use and for higher productivity with an increased number of recorded documents. In order to satisfy such demands, an ink having a low surface tension and dissolved oxygen content is used to enhance purge recovery (recovery from ejection failure by means of suction of ink from an ejection port) (see Japanese Patent Laid-Open No. 2004-083621).

In order to increase productivity, the present inventors tried to increase the main tank capacity in an ink jet recording apparatus that includes a main tank and a sub tank. The main tank is a main ink storage portion and includes an air communication part. It was confirmed that the use of an ink having a low dissolved oxygen content described in Japanese Patent Laid-Open No. 2004-083621 tended to improve reliability. However, recording involving ink ejection for extended periods using a recording apparatus including a large main tank tended to cause gradually degraded image quality. Such degradation was not prevented with an ink described in Japanese Patent Laid-Open No. 2004-083621.

SUMMARY OF THE INVENTION

An ink jet recording method according to the present invention is an ink jet recording method comprising ejecting an aqueous ink from a recording head to record an image on a recording medium using an ink jet recording apparatus. The ink jet recording apparatus includes a first ink storage portion having an air communication part, a second ink storage portion, and a recording head. The first ink storage portion has a maximum ink storage amount ($V_1$) 3.0 or more to 50.0 or less times larger than the maximum ink storage amount ($V_2$) of the second ink storage portion. The temperature ($T_2$) of the ink in the second ink storage portion is higher than the temperature ($T_1$) of the ink in the first ink storage portion. The aqueous ink contains a coloring material and a surfactant having a hydrophilic-lipophilic balance (HLB) of 8.0 or more.

Further features of the present invention will become apparent from the following description of examples with reference to the attached drawings.

DESCRIPTION OF THE EMBODIMENTS

Figure 1:
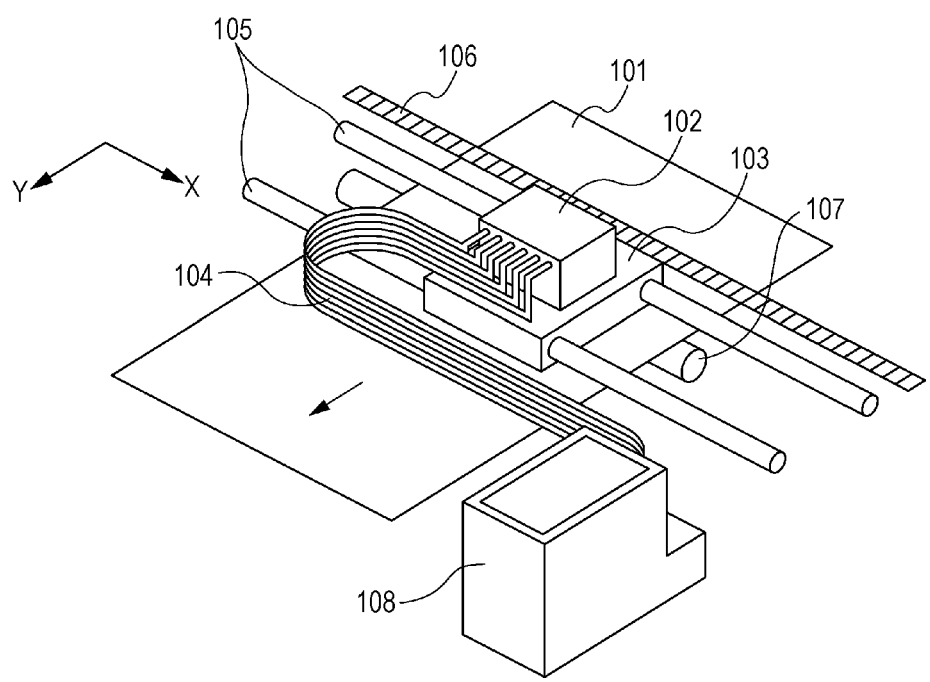
FIG. 1 is a schematic perspective view of an ink jet recording apparatus according to an embodiment of the present invention.

The present invention will be further described in the following preferred embodiments. Aqueous ink jet inks are hereinafter also referred to simply as "inks", the first ink storage portion is hereinafter also referred to as a "main tank", and the second ink storage portion is hereinafter also referred to as a "sub tank". Unless otherwise specified, the physical properties are determined at normal temperature (25° C.)

First, the present inventors investigated the cause of degraded image quality during ink ejection for extended periods using an ink jet recording apparatus including a main tank having an air communication part and a sub tank. The main tank and the sub tank differ significantly in the maximum ink storage amount. It was found that while ink was ejected from a recording head to record many images, bubbles tended to enter an ink passage of the recording head and impede normal ink ejection, thereby causing degraded image quality.

The present inventors, then investigated the reason for such a phenomenon. It was found that the dissolved gas in the ink in the main tank having the air communication part increased with time. While the ink was supplied to the recording head through the sub tank, bubbles were deposited on the ink passage of the recording head and impeded normal ink ejection. This phenomenon will be described below.

An ink jet recording apparatus according to the present invention includes a large main tank in order to increase productivity. Thus, the capacity ratio of the main tank to the sub tank is increased. The main tank has an air communication part. While an ink is ejected from the recording head of the recording apparatus for extended periods, the following phenomenon occurs with the consumption of the ink. As the ink is consumed, the ink level of the main tank decreases, and air is introduced into the main tank through the air communication part. The large main tank incorporates much air, and the ink remains in the main tank for extended periods, although the ink level gradually decreases. Thus, the contact time between the ink and air in the recording apparatus is much longer than known recording apparatuses having a normal ink storage amount. This facilitates dissolution of air in the ink and gradually increases the amount of dissolved gas in the ink.

While the ink containing the increased amount of dissolved gas in the main tank is supplied to the recording head through the sub tank, the following phenomenon will occur. The ink flows through an ink supply system composed of members having different diameters, such as a tube, the sub tank, and the ink passage of the recording head. Owing to variations in the diameter of the members through which the ink flows, the pressure exerted on the ink can change drastically at a certain point. When the pressure exerted on the ink containing a large amount of dissolved gas decreases drastically at such a point, the dissolved gas in the ink cannot maintain the dissolved state and tends to form bubbles. Bubbles thus formed enter the ink passage of the recording head and are deposited on the flow path wall, thereby impeding normal ink ejection.

The present inventors have studied a method for maintaining good ejection properties even when the amount of dissolved gas in the ink tends to increase. It was found that the number of bubbles entering the ink passage of the recording head decreases when the ink has a higher temperature in the sub tank than in the main tank. We assume the following mechanism for this.

It is known that the viscosity of ink decreases with increasing temperature. When the temperature of ink is higher in the sub tank than in the main tank, the viscosity of the ink is higher in the main tank than in the sub tank. Thus, the viscosity of the ink decreases when the ink is supplied from the main tank to the sub tank. Bubbles, if present at all, in the ink in the sub tank can move easily. Owing to the high temperature of the ink in the sub tank, air of the bubbles is heated, and the bubbles are expanded and have a lower density. This facilitates the movement of the bubbles in a direction opposite to gravity and thereby decreases the number of bubbles entering the ink passage of the recording head.

When the ink in the sub tank has a high temperature, however, dissolved gas in the ink can scarcely maintain its dissolved state and tends to form bubbles. Hence, even when the temperature of ink is higher in the sub tank than in the main tank, the number of bubbles cannot be decreased enough to prevent degradation in ejection properties.

As a result of further studies, the present inventors have found that it is effective to add a surfactant to ink while setting the temperature of the ink higher in the sub tank than in the main tank. The surfactant has an HLB of 8.0 or more as determined by Griffin's method. Under these conditions, bubbles can disappear, and good ejection properties can be maintained during ink ejection for extended periods. We assume the following mechanism for this.

The surfactant having an HLB of 8.0 or more as determined by Griffin's method has a hydrophilic-hydrophobic balance suitable for the presence at the gas-liquid interface between bubbles and aqueous ink. In addition, the surfactant has a hydrophilic group of a moderate size and thereby forms a hydrogen bond with water molecules in the ink. When the temperature of the ink is higher in the sub tank than in the main tank, water molecules of the ink are more active in the sub tank than in the main tank, and hydrogen bonds between the surfactant and water molecules are more likely to be broken in the sub tank than in the main tank. This results in lower solubility of the surfactant in the aqueous ink, and therefore bubbles, if present at all, in the ink in the sub tank can disappear more easily because the surfactant is difficult to be present at the gas-liquid interface between the bubbles and the ink.

Even if the ink contains the surfactant having an HLB of 8.0 or more, when the temperature relationship is not satisfied, the ejection properties cannot be satisfactory. The surfactant is composed of nonionic molecules, and the nonionic molecules at the gas-liquid interface of bubble films in the ink do not induce electrostatic repulsion. Thus, adjacent bubbles tend to coalesce. Coalescent bubbles have increased sizes and buoyancy and may be hindered from entering the ink passage of the recording head. In contrast, small bubbles that do not have increased buoyancy even after coalescence cannot be hindered from entering the ink passage of the recording head. This is because the surfactant has a hydrophilic group of a moderate size, forms a hydrogen bond with water molecules in the ink, and thereby facilitates the wetting of bubbles with the ink.

A surfactant having an HLB of less than 8.0 has a very low solubility in water of the aqueous ink and cannot be stable at the gas-liquid interface between bubbles and the ink. Thus, even when the temperature of ink is higher in the sub tank than in the main tank, bubbles rarely disappear.

Thus, the use of a particular surfactant while setting the temperature of ink higher in the sub tank than in the main tank can decrease the number of bubbles entering the ink passage and facilitate the disappearance of bubbles. Under these conditions, even in the case where bubbles are easily formed, the number of bubbles can be decreased, and good ejection properties can be maintained.

An ink jet recording method according to the present invention, as well as an ink jet recording apparatus, a recording head, and an aqueous ink that can be suitably used in an ink jet recording method according to the present invention will be described below.

<General Structure of Ink Jet Recording Apparatus>

An ink jet recording method according to the present invention is an ink jet recording method for ejecting an aqueous ink from a recording head to record an image on a recording medium by using an ink jet recording apparatus that includes a first ink storage portion having an air communication part, a second ink storage portion, and a recording head. The first ink storage portion has a maximum ink storage amount $V_1$ (mL) 3.0 or more to 50.0 or less times larger than the maximum ink storage amount $V_2$ (mL) of the second ink storage portion. The temperature $T_2$ (° C.) of the ink in the second ink storage portion is higher than the temperature $T_1$ (° C.) of the ink in the first ink storage portion. The aqueous ink contains a coloring material and a surfactant having an HLB of 8.0 or more as determined by Griffin's method. An ink jet recording method according to the present invention and an ink jet recording apparatus for use in the ink jet recording method will be described in detail below with reference to the accompanying drawings.

FIG. 1 is a schematic perspective view of an ink jet recording apparatus according to an embodiment of the present invention. The ink jet recording apparatus is of a serial type. In the recording operation, a recording head of the ink jet recording apparatus is reciprocally scanned in the X direction (main scanning direction). A recording medium 101 is intermittently conveyed in the Y direction (sub-scanning direction) by a conveying roller 107. The recording medium may be a recording medium having no coated layer, such as plain paper, or a recording medium having a coated layer, such as glossy paper or matte paper. A recording unit 102 on a carriage 103 is reciprocally scanned in the X direction (main scanning direction) perpendicular to the Y direction, which is the conveying direction of the recording medium 101. The recording operation is performed by a combination of the conveyance of the recording medium 101 in the Y direction and the reciprocal scanning of the recording unit 102 in the X direction.

Figure 2:
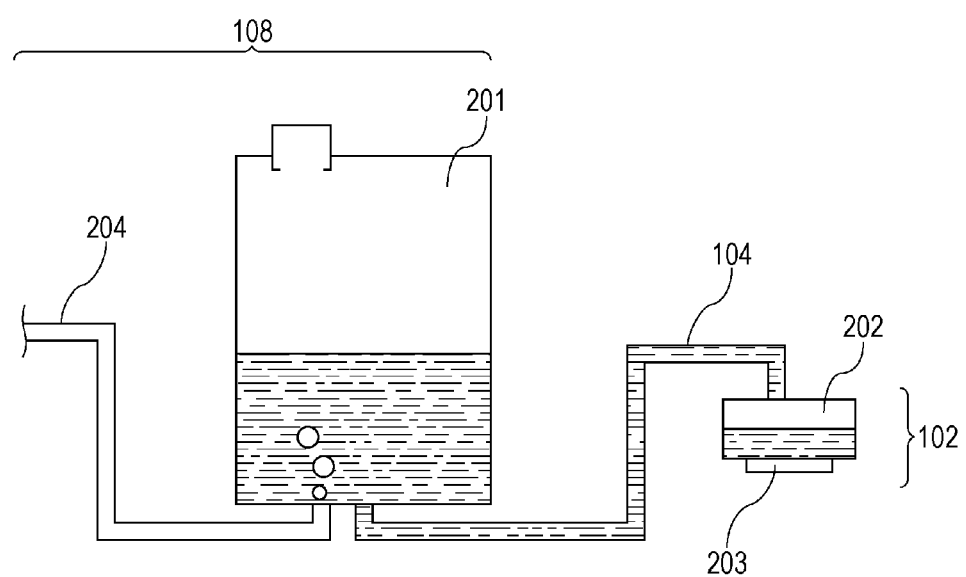
FIG. 2 is a schematic view of an ink supply system.

FIG. 2 is a schematic view of an ink supply system. As illustrated in FIG. 2, the recording unit 102 includes a recording head 203 of an inkjet type and a sub tank 202. The sub tank 202 is a second ink storage portion. An ink supplied is ejected from a plurality of ejection ports of the recording head 203. The recording unit 102 is disposed on the carriage 103, as illustrated in FIG. 1. The carriage 103 is movably supported by guide rails 105 along the X direction and is fixed to an endless belt 106 parallel to the guide rails 105. The endless belt 106 is reciprocated by the driving force of a motor. The reciprocating motion of the endless belt 106 causes reciprocal scanning of the carriage 103 in the X direction.

A main tank 201 is housed in a main tank storage portion 108 (FIG. 2). The main tank 201 is a first ink storage portion. The main tank 201 in the main tank storage portion 108 is coupled to the sub tank 202 of the recording unit 102 via an ink supply tube 104. In order to reduce variations in the diameter of the members through which the ink flows and thereby decrease the number of points at which bubbles are formed, the main tank 201 can be coupled to the sub tank 202 via the ink supply tube 104 alone. An ink is supplied from the main tank 201 to the sub tank 202 through the ink supply tube 104 and is ejected from the ejection ports of the recording head 203. The number of these members corresponds to the number of inks.

An ink (indicated by hatching) in the main tank 201 is supplied to the sub tank 202 through the ink supply tube 104 and is then supplied to the recording head 203. The main tank 201 is also coupled to a gas inlet tube 204, which serves as an air communication part. With the consumption of the ink by image recording, the ink in the main tank 201 is supplied to the sub tank 202 and decreases. As the ink in the main tank 201 decreases, air is introduced into the main tank 201 through the gas inlet tube 204. One end of the gas inlet tube 204 is opened to the air. Thus, the negative internal pressure for holding the ink in the ink supply system is maintained almost constant.

In the present invention, the maximum ink storage amount $V_1$ (mL) of the main tank 201 is 3.0 or more to 50.0 or less times, preferably 5.0 or more to 40.0 or less times, larger than the maximum ink storage amount $V_2$ (mL) of the sub tank 202.

The maximum ink storage amount $V_1$ (mL) of the main tank 201 can be increased to decrease the frequency of replacement of the tank or to increase the number of recorded media and thereby enhance productivity. More specifically, the maximum ink storage amount $V_1$ (mL) of the main tank 201 is preferably 60.0 mL or more to 200.0 mL or less, more preferably 60.0 mL or more to 150.0 mL or less. The initial loading of the ink in the main tank 201 is preferably approximately 95% or less of the maximum ink storage amount.

The maximum ink storage amount $V_2$ (mL) of the sub tank 202 can also be increased to decrease the frequency of ink supply from the main tank 201 or to stabilize the ink filling of the recording head 203. In an ink jet recording apparatus of a serial type, as illustrated in FIG. 1, however, the maximum ink storage amount $V_2$ (mL) of the sub tank 202 on the carriage 103 should not be excessively increased. An excessively large ink storage amount of the sub tank 202 requires an excessively large recording unit. 102, thus resulting in a low movement speed of the carriage 103 or requiring a higher strength of the endless belt 106 or motor for moving the carriage 103. Thus, the maximum ink storage amount $V_2$ (mL) of the sub tank 202 is preferably 1.0 mL or more to 35.0 mL or less, more preferably 2.0 mL or more to 20.0 mL or less, particularly preferably 5.0 mL or more to 15.0 mL or less.

The first ink storage portion and the second ink storage portion (housing) can be formed of a thermoplastic resin, such as polyester, polycarbonate, polypropylene, polyethylene, polystyrene, or polyphenylene ether, a mixture thereof, or a modified thermoplastic resin. The housing may contain an ink absorbing member that can produce a negative pressure for holding ink. The ink absorbing member can be compressed fibers made of a resin, such as polypropylene or urethane. The housing may directly contain ink without the ink absorbing member.

The recording unit 102 illustrated in FIG. 2 includes the recording head 203 and the sub tank 202. A recording unit that is a head cartridge including a sub tank and a recording head may be mounted on the carriage. A recording unit including a sub tank and a recording head in an integrated manner may be mounted on the carriage. In the present invention, as illustrated in FIGS. 1 and 2, a recording unit in cartridge form including the sub tank 202, which is a second ink storage portion, and the recording head 203 in an integrated manner can be mounted on the carriage 103. In particular, the second ink storage portion or sub tank can be a housing made of a thermoplastic resin, and a recording element substrate including a recording head can be directly bonded to the sub tank without any member, such as a heat sink plate, interposed therebetween.

The ink election method of the recording head can utilize mechanical energy of a piezoelectric element or thermal energy of an electrothermal transducer. In the present invention, ink can be ejected by thermal energy.

In the present invention, the temperature $T_2$ (° C.) of ink in the sub tank. 202 is higher than the temperature $T_1$ (° C.) of the ink in the main tank 201 ($T_2 > T_1$). The difference between the temperature $T_2$ (° C.) of ink in the sub tank 202 and the temperature $T_1$ (° C.) of the ink in the main tank 201 is preferably 5° C. or more. The temperature $T_1$ (° C.) of ink in the main tank 201 is preferably 5° C. or more to 40° C. or less, more preferably 10° C. or more to 35° C. or less, particularly preferably 15° C. or more to 30° C. or less. The temperature $T_2$ (° C.) of ink in the sub tank 202 is preferably 10° C. or more to 50° C. or less, more preferably 15° C. or more to 45° C. or less, particularly preferably 20° C. or more to 40° C. or less.

The temperature of ink in the main tank 201 and the sub tank 202 may be controlled by any method. For example, an ink temperature control unit may be disposed outside or inside the tank. The ink temperature control unit may be an ink cooling unit, an ink heating unit, and/or a unit for maintaining ink at a constant temperature. In the present invention, the main tank 201 can be equipped with no ink temperature control unit, and the temperature of ink in the sub tank 202 can be controlled to satisfy $T_2 > T_1$. More specifically, in the sub tank 202, a housing made of a thermoplastic resin is directly bonded to a recording element substrate including the recording head 203 having an electrothermal transducer, without any member interposed therebetween. The electrothermal transducer can supply the ink in the sub tank 202 with thermal energy and thereby control the temperature of (heat) the ink in the sub tank 202 so as to satisfy $T_2 > T_1$. The ink may be heated by thermal energy that does not cause ejection. Alternatively, the ink may be heated by thermal energy that causes ejection, and the thermal energy may be utilized to heat the ink in the sub tank 202.

<Aqueous Ink>

In an ink jet recording method according to the present invention, an aqueous ink is ejected from ejection ports of a recording head to record an image on a recording medium. The aqueous ink contains a coloring material and a surfactant having an HLB of 8.0 or more as determined by Griffin's method. The components of the aqueous ink will be described below.

Coloring Material

The coloring material can be a pigment or dye. The coloring material content (% by mass) of the aqueous ink is preferably 0.1% or more to 15.0% or less by mass, more preferably 1.0% or more to 10.0% or less by mass, of the total mass of the ink.

If the coloring material is a pigment, the pigment can be dispersed by any method. For example, the pigment can be a resin-dispersed pigment dispersed with a resin dispersant, a pigment dispersed with a surfactant, or a microcapsule pigment at least part of which is coated with a resin. Furthermore, the pigment can be a self-dispersible pigment having a functional group including a hydrophilic group, such as an anionic group, on its surface, or a pigment having a polymer-containing organic group chemically bonded to its surface (a resin-bonded self-dispersible pigment). As a matter of course, pigments of different dispersion types can be used in combination.

The pigment used as the coloring material may be of any type. Examples of the pigment include, but are not limited to, inorganic pigments, such as carbon black, and organic pigments, such as azo, phthalocyanine, guinacridone, isoindolinone, imidazolone, diketopyrrolopyrrole, and dioxazine. These pigments may be used alone or in combination as required.

The dye used as the coloring material may be of any type. Examples of the dye include, but are not limited to, direct dyes, acid dyes, basic dyes, disperse dyes, and food dyes. In particular, dyes having an anionic group may be used. Examples of the skeleton of the dye include, but are not limited to, azo, triphenylmethane, phthalocyanine, azaphthalocyanine, xanthene, and anthrapyridone.

In the present invention, the coloring material can be a pigment, particularly a self-dispersible pigment. As compared with dyes, pigments, particularly self-dispersible pigments, have higher hydrophobicity and lower affinity to bubbles, and can therefore efficiently prevent degradation in ejection properties during ink ejection for extended periods. Self-dispersible pigments subjected to surface oxidation treatment have increased hydrophobicity due to their rough surface resulting from the oxidation treatment and have lower affinity to bubbles, thus more efficiently preventing degradation in ejection properties during ink ejection for extended periods.

Surfactant

The aqueous ink contains a surfactant having an HLB of 8.0 or more as determined by Griffin's method. An HLB of less than 8.0 results in degraded ejection properties during ink ejection for extended periods. The HLB is preferably 19.5 or less, more preferably 18.0 or less. The HLB can be calculated by Griffin's method using the following formula (1). The HLB calculated by Griffin's method is a physical property indicating the hydrophilicity or lipophilicity of nonionic surfactants and ranges from 0.0 to 20.0. A lower HLB indicates higher lipophilicity, and a higher HLB indicates higher hydrophilicity.

$$HLB = 20 \times \text{formula weight of hydrophilic group of surfactant/molecular weight of surfactant} \quad (1)$$

The concept of HLB is applicable to nonionic surfactants. Thus, surfactants having an anionic group (a carboxylic acid group, a sulfonic acid group, or a phosphate group) or a cationic group (an amine structure) are not "surfactants having an HLB of 8.0 or more".

Any type of surfactant having an HLB of 8.0 or more may be used. For example, surfactants having a hydrocarbon, fluorinated, or silicone skeleton may be used. The surfactant content (% by mass) of the ink is preferably 0.1% or more to 5.0% or less by mass, more preferably 0.5% or more to 1.5% or less by mass, of the total mass of the ink.

Hydrocarbon surfactants can efficiently prevent degradation in ejection properties during ink ejection for extended periods. Examples of such surfactants include, but are not limited to, polyoxyethylene alkyl ethers, ethylene oxide adducts of acetylene glycol, ethylene oxide adducts of glycerin, and polyethylene glycol polypropylene glycol block copolymers. In particular, ethylene oxide adducts of acetylene glycol and ethylene oxide adducts of glycerin have a high degree of symmetry in the molecular structure and exhibit good debubbling properties.

Resin

The aqueous ink can contain a resin. The resin in the aqueous ink may be dissolved in an aqueous medium or may be dispersed as resin particles in an aqueous medium. The term "water-soluble resin", as used herein, means that the resin neutralized with an alkali in an amount equivalent to the acid value of the resin does not form particles having a size measurable, for example, by a dynamic light scattering method. The resin preferably has an acid value of 40 mgKOH/g or more. The water-soluble resin may have an anionic group that forms a salt. Examples of cations that can form salts include, but are not limited to, alkali metal cations, such as lithium, sodium, and potassium; ammonium ion ($NH_4^+$); and cations of organic ammoniums, such as dimethylamine and triethanolamine. The upper limit of the acid value of the resin is preferably 300 mgKOH/g or less. If the resin is an acrylic resin, the acid value of the resin is preferably 250 mgKOH/g or less, more preferably 240 mgKOH/g or less. If the resin is a urethane resin, the acid value of the resin is preferably 200 mgKOH/g or less, more preferably 160 mgKOH/q or less.

Examples of the resin include, but are not limited to, acrylic resins, polyester resins, urethane resins, urea resins, polysaccharides, and polypeptides. Acrylic resins and urethane resins can provide good election characteristics, of the recording head. A resin component in the form of particles tends to hold bubbles. Thus, the aqueous ink should not contain an excess amount of such a resin component.

Compound Represented by General Formula (I)

The present inventors have studied a method for suppressing the formation of bubbles to more consistently maintain good ejection properties even when the amount of dissolved gas in the ink tends to increase. It was found that a surfactant in the vicinity of gas-liquid interface of the ink should be minimized to suppress the formation of bubbles, and this is achieved by making surfactant molecules closer to water molecules of the main liquid medium of the aqueous ink. The present inventors have searched for a material that can achieve this and have found that a compound represented by the general formula (I) described later is effective.

The compound represented by the general formula (I) includes "—C(=O)—N(-$R_1$)—C(=O)—N(—$R_2$)—" and "—C(—$R_3$)$_2$—" in its structure. The former structure has hydrogen bonding ability, and the latter structure has relatively high hydrophobicity. Thus, the compound represented by the general formula (I) induces the following interactions in the ink. The "—C(—$R_3$)$_2$—" moiety of the compound represented by the general formula (I) has a hydrophobic interaction with a hydrophobic moiety of the surfactant. The "—C(=O)—N(—$R_1$)—C(=O)—N(—$R_2$)—" moiety of the compound represented by the general formula (I) has a hydrogen bonding interaction with water molecules. These interactions bring water molecules and the surfactant closer together in the ink via the compound represented by the general formula (I) and thereby reduce the amount of surfactant in the vicinity of the ink interface. Thus, even in the case where bubbles are easily formed as described above, the number of bubbles can be effectively decreased, and good ejection properties can be more consistently maintained.

The aqueous ink can contain a compound represented by the following general formula (I). The amount of the compound represented by the general formula (I) (% by mass) in the ink is preferably 0.1% or more to 15.0% or less by mass, more preferably 0.5% or more to 10.0% or less by mass, of the total mass of the ink.

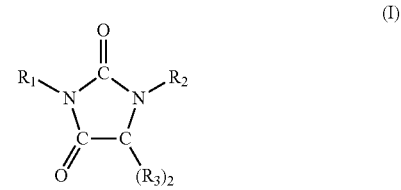

(I)

In general formula (I), $R_1$ and $R_2$ each independently represents a hydrogen atom or a hydroxyalkyl group, and each $R_3$s independently represents a hydrogen atom or an alkyl group.

The hydroxyalkyl group of $R_1$ and $R_2$ preferably has 1 to 5, more preferably 1 to 3, carbon atoms. The hydroxyalkyl group of $R_1$ and $R_2$ may be a hydroxymethyl, hydroxyethyl, hydroxy n-propyl, hydroxy isopropyl, hydroxy n-butyl, hydroxy isobutyl, or hydroxypentyl group. In particular, the hydroxyalkyl group of $R_1$ and $R_2$ may be a hydroxymethyl or hydroxyethyl group. The alkyl group of $R_3$ preferably has 1 to 3 carbon atoms. The alkyl group of $R_3$ may be a methyl, ethyl, or n-propyl group. In particular, the alkyl group of $R_3$ may be a methyl group.

The compound represented by the general formula (I) may be 3-(hydroxymethyl)-5,5-dimethylhydantoin, 3-(2-hydroxyethyl)-5,5-dimethylhydantoin, or 1,3-bis(2-hydroxyethyl)-5,5-dimethylhydantoin. As a matter of course, any compound having the structure represented by the general formula (I) and covered by the definition may be used in the present invention. Among the compounds represented by the general formula. (I), 1,3-bis(2-hydroxyethyl)-5,5-dimethylhydantoin may be used. Because of its molecular structure, this compound can efficiently induce the interaction between the surfactant and water molecules and thereby efficiently prevent degradation in ejection properties during ink ejection for extended periods.

Aqueous Medium

The aqueous ink can contain an aqueous medium containing water and a water-soluble organic solvent. The water-soluble organic solvent may be a water-soluble organic solvent for use in ink jet inks, such as an alcohol, (poly)alkylene glycol, glycol ether, nitrogen-containing compound, or sulfur-containing compound. These water-soluble organic solvents may be used alone or in combination. The water-soluble organic solvent content (% by mass) of the aqueous ink is preferably 3.0% or more to 50.0% or less by mass of the total mass of the ink. The water can be deionized water or ion-exchanged water. The water content (% by mass) of the aqueous ink is preferably 50.0% or more to 95.0% or less by mass of the total mass of the ink.

Other Components

In addition to the components described above, the aqueous ink can contain a water-soluble organic compound that is solid at normal temperature, such as urea, trimethylolpropane, or trimethylolethane. The water-soluble organic compound content (% by mass) of the aqueous ink is preferably 0.1% or more to 10.0% or less by mass of the total mass of the ink. In order to produce an aqueous ink having desired physical properties, the aqueous ink can contain various additive agents, such as a surfactant, an antifoaming agent, a pH adjuster, a preservative, a fungicide, an antioxidant, and/or a reducing inhibitor, if necessary.

Physical Properties of Ink

An aqueous ink according to an embodiment of the present invention is used in an ink jet system. The physical properties of the aqueous ink can be appropriately adjusted for the ink jet system. More specifically, the ink preferably has a surface tension of 25 mN/m or more to 45 mN/m or less at 25° C. The ink preferably has a viscosity of 1.0 mPa s or more to 5.0 mPa·s or less, more preferably 1.0 mPa·s or more to 4.0 mPa·s or less, at 25° C. The ink preferably has a pH of 5.0 or more to 10.0 or less, more preferably 7.0 or more to 9.0 or less, at 25° C.

EXAMPLES

Although the present invention is further described below in the Examples and comparative examples, the present invention is not limited to these Examples within the gist of the present invention. Unless otherwise specified, "part" and "%" with respect to the amount of component are based on mass.

<Preparation of Liquid Containing Coloring Material>

Pigment Dispersion Liquid 1

A mixture of 500 g of ion-exchanged water and 15.0 g of a pigment (carbon black, "Black Pearls 880" (trade name), manufactured by Cabot Corporation) was agitated at a rotational speed of 15,000 rpm for 30 minutes for pre-wetting of the pigment. After 4,485 g of ion-exchanged water was added to the mixture, the mixture was dispersed in a high-pressure homogenizer to prepare a dispersion liquid. The dispersion liquid was transferred to a pressure vessel. Ozone water having an ozone concentration of 100 ppm was introduced into the pressure vessel at a pressure of 3.0 MPa. The pigment was subjected to oxidation treatment. The mixture was removed from the pressure vessel. The pH of the mixture was adjusted to 10.0 by the addition of aqueous sodium hydroxide. A proper amount of ion-exchanged water was added to the mixture to adjust the pigment content. Thus, a pigment dispersion liquid 1 was prepared. The pigment dispersion liquid. 1 contained a self-dispersible pigment. A carboxylic acid group having a sodium counter ion was directly bonded to the surface of the particles of the self-dispersible pigment. The pigment content was 10.0%.

Pigment Dispersion Liquid 2

A solution of 70.6 mmol of concentrated hydrochloric acid in 5.5 g of water was cooled to a temperature of 5° C. To the solution was added 9.8 mmol of 4-aminophthalic acid. The solution in a container was agitated in an ice bath and was kept at 10° C. or less. To the solution was added a solution of 24.9 mmol of sodium nitrite in 9.0 g of 5° C. water. After agitation for another 15 minutes, 6.0 g of a pigment was added to the solution under agitation. The pigment was carbon black ("Black Pearls 880" (trade name), manufactured by Cabot Corporation). After agitation for another 15 minutes, a slurry was obtained. The slurry was passed through a filter paper ("standard filter paper No. 2" (trade name), manufactured by Advantec Toyo Kaisha, Ltd.), was sufficiently washed with water, and was dried in an oven at a temperature of 110° C., thus producing a self-dispersible pigment. The pigment content was adjusted with ion-exchanged water. Thus, a pigment dispersion liquid 2 was obtained. The pigment dispersion liquid 2 contained a self-dispersible pigment. A phthalic acid group having a sodium counter ion was bonded to the surface of the particles of the self-dispersible pigment. The pigment content was 10.0%.

Pigment Dispersion Liquid 3

7.0 g of a pigment, 14.0 mmol of monosodium ((4-aminobenzoylamino)-methane-1,1-diyl) bisphosphonate, 40.0 mmol of nitric acid, and 200.0 mL of pure water were mixed. C.I. Pigment Blue 15:3 was used as a pigment. Mixing was performed at 6,000 rpm with a Silverson mixer at room temperature. After 30 minutes, 40.0 mmol of sodium nitrite dissolved in a small amount of water was slowly added to the mixture. The addition of the sodium nitrite increased the temperature of the mixture to 60° C. Under this condition, the mixture was allowed to react for one hour. The pH of the mixture was adjusted to 10 with aqueous sodium hydroxide. After 30 minutes, 20.0 mL of pure water was added to the mixture. The mixture was subjected to diafiltration with a Spectrum membrane. The pigment content was ad lusted with ion-exchanged water. Thus, a pigment dispersion liquid 3 was obtained. The pigment dispersion liquid 3 contained a self-dispersible pigment. A ((benzoylamino)-methane-1,1-diyl)bisphosphonate group having a sodium counter ion was bonded to the surface of the particles of the self-dispersible pigment. The pigment content was 10.0%.

Pigment Dispersion Liquid 4

A pigment dispersion liquid 4 was produced in the same manner as the pigment dispersion liquid 3 except that the pigment was C.I. Pigment Red 122. The pigment dispersion liquid 4 contained a self-dispersible pigment. A ((benzoylamino)-methane-1,1-diyl)bisphosphonate group having a sodium counter ion was bonded to the surface of the particles of the self-dispersible pigment. The pigment content was 10.0%.

Pigment Dispersion Liquid 5

A pigment dispersion liquid 5 was produced in the same manner as the pigment dispersion liquid 3 except that the pigment was C.I. Pigment Yellow 74. The pigment dispersion liquid 5 contained a self-dispersible pigment. A ((benzoylamino)-methane-1,1-diyl)bisphosphonate group having a sodium counter ion was bonded to the surface of the particles of the self-dispersible pigment. The pigment content was 10.0%.

Pigment Dispersion Liquid 6

A mixture of 10.0 parts of a pigment, 20.0 parts of an aqueous solution of a resin dispersant (resin (solid) content: 20.0%), and 70.0 parts of ion-exchanged water was prepared. The pigment was carbon black ("Black Pearls 880" (trade name), manufactured by Cabot Corporation). The aqueous solution of the resin dispersant was a water-soluble resin of a styrene-acrylic acid copolymer (weight-average molecular weight: 10,000, acid value: 200 mgKOEH/g) dissolved in ion-exchanged water using sodium hydroxide in an amount equivalent to the acid value. The mixture was dispersed in a batch-type vertical sand mill for three hours and was then pressed through a microfilter having a pore size of 1.2 μm (manufactured by Fujifilm Corporation). The pigment content was then adjusted with ion-exchanged water. Thus, a pigment dispersion liquid 6 was obtained. The pigment dispersion liquid 6 contained the pigment dispersed in the water-soluble resin. (resin dispersant). The pigment content was 10.0%, and the water-soluble resin content was 4.0%.

Pigment Dispersion Liquid 7

A pigment dispersion liquid 7 was produced in the same manner as the pigment dispersion liquid 6 except that the pigment was C.I. Pigment. Blue 15:3. The pigment dispersion liquid 7 contained the pigment dispersed in the water-soluble resin (resin dispersant). The pigment content was 10.0%, and the water-soluble resin content was 4.0%.

Pigment Dispersion Liquid 8

A pigment dispersion liquid 8 was produced in the same manner as the pigment dispersion liquid 6 except that the pigment was C.I. Pigment Red 122. The pigment dispersion liquid 8 contained the pigment dispersed in the water-soluble resin (resin dispersant). The pigment content was 10.0%, and the water-soluble resin content was 4.0%.

Pigment Dispersion Liquid 9

A pigment dispersion liquid 9 was produced in the same manner as the pigment dispersion liquid 6 except that the pigment was C.I. Pigment Yellow 74. The pigment dispersion liquid 9 contained the pigment dispersed in the water-soluble resin (resin dispersant). The pigment content was 10.0%, and the water-soluble resin content was 4.0%.

Aqueous Dye Solution 1

The dye content of a commercially available aqueous dye solution ("Projet Fast Black 2" (trade name), manufactured by Fujifilm Corporation) was adjusted to prepare an aqueous dye solution 1. The dye content of the aqueous dye solution 1 was 10.0%.

Aqueous Dye Solution 2

The dye content of a commercially available aqueous dye solution ("Projet Fast Magenta" (trade name), manufactured by Fujifilm Corporation) was adjusted to prepare an aqueous dye solution 2. The dye content of the aqueous dye solution 2 was 10.0%.

<Preparation of Ink>

The components (unit: %) in Tables 1 to 3 were sufficiently mixed and were pressed through a microfilter having a pore size of 3.0 μm (manufactured by Corporation) to prepare inks. 1,3-bis(2-hydroxyethyl)-5,5-dimethylhydantoin was used as a compound represented by the general formula (I). The figure in parentheses for each surfactant is an HLB determined by Griffin's method. Surfynol 420 and 440 (trade name) are ethylene oxide adducts of acetylene glycol manufactured by Nissin Chemical Industry Co., Ltd. Agetylenol E40, E100, and E300 (trade name) are ethylene oxide adducts of acetylene glycol manufactured by Kawaken Fine Chemicals Co., Ltd. Uniox G-450 and G-1200 (trade name) are ethylene oxide adducts of glycerin manufactured by NOF Corporation. NIKKOL BO-50 (trade name) is a polyoxyethylene oleyl ether manufactured by Nikko Chemicals Co., Ltd. In order to eliminate the effects of dissolved gases during ink preparation, the dissolved oxygen content of the inks was decreased to 2 mg/L or less with a general-purpose deaeration module. The dissolved oxygen content was measured with a dissolved oxygen meter ("Portable Dissolved Oxygen meter OM-71-L1" (trade name), manufactured by Horiba, Ltd.)

TABLE 1

|  | Ink No. | | | | | | | | | |
|---|---|---|---|---|---|---|---|---|---|---|
|  | 1 | 2 | 3 | 4 | 5 | 6 | 7 | 8 | 9 | 10 |
| Pigment dispersion liquid 1 | 50.0 | 50.0 | 50.0 | 50.0 | 50.0 | 50.0 | 50.0 | | | |
| Pigment dispersion liquid 2 | | | | | | | | 50.0 | | |
| Pigment dispersion liquid 3 | | | | | | | | | | |
| Pigment dispersion liquid 4 | | | | | | | | | | |
| Pigment dispersion liquid 5 | | | | | | | | | | |
| Pigment dispersion liquid 6 | | | | | | | | | 50.0 | |
| Pigment dispersion liquid 7 | | | | | | | | | | |
| Pigment dispersion liquid 8 | | | | | | | | | | |
| Pigment dispersion liquid 9 | | | | | | | | | | |
| Aqueous dye solution 1 | | | | | | | | | | 50.0 |
| Aqueous dye solution 2 | | | | | | | | | | |
| Glycerin | 10.0 | 10.0 | 10.0 | 10.0 | 10.0 | 10.0 | 10.0 | 10.0 | 10.0 | 10.0 |
| Triethylene glycol | 6.0 | 6.0 | 6.0 | 6.0 | 6.0 | 6.0 | 6.0 | 6.0 | 6.0 | 6.0 |

TABLE 1-continued

|  | Ink No. | | | | | | | | | |
|---|---|---|---|---|---|---|---|---|---|---|
|  | 1 | 2 | 3 | 4 | 5 | 6 | 7 | 8 | 9 | 10 |
| 2-pyrrolidone | 5.0 | 5.0 | 5.0 | 5.0 | 5.0 | 5.0 | 5.0 | 5.0 | 5.0 | 5.0 |
| Compound represented by general formula (I) | | | | | | | | | | |
| Surfynol 420 (4.0) | | | | | | | | | | |
| Surfynol 440 (8.0) | | 0.4 | | | | | | | | |
| Acetylenol E40 (8.8) | | | 0.6 | | | | | | | |
| Acetylenol E100 (13.2) | 0.8 | | | | | | | 0.8 | 0.8 | 0.8 |
| Uniox G-450 (15.6) | | | | 1.2 | | | | | | |
| Acetylenol E300 (17.1) | | | | | 1.2 | | | | | |
| NIKKOL BO50 (17.8) | | | | | | 1.2 | | | | |
| Uniox G-1200 (19.1) | | | | | | | 1.2 | | | |
| Ion-exchanged water | 28.2 | 28.6 | 28.4 | 27.8 | 27.8 | 27.8 | 27.8 | 28.2 | 28.2 | 28.2 |

TABLE 2

|  | Ink No. | | | | | | | | | |
|---|---|---|---|---|---|---|---|---|---|---|
|  | 11 | 12 | 13 | 14 | 15 | 16 | 17 | 18 | 19 | 20 |
| Pigment dispersion liquid 1 | 50.0 | | | | | | | | | |
| Pigment dispersion liquid 2 | | | | | | | | | | |
| Pigment dispersion liquid 3 | | | 50.0 | 50.0 | 50.0 | 50.0 | 50.0 | 50.0 | 50.0 | |
| Pigment dispersion liquid 4 | | | | | | | | | | 50.0 |
| Pigment dispersion liquid 5 | | | | | | | | | | |
| Pigment dispersion liquid 6 | | | | | | | | | | |
| Pigment dispersion liquid 7 | | | | | | | | | | |
| Pigment dispersion liquid 8 | | | | | | | | | | |
| Pigment dispersion liquid 9 | | | | | | | | | | |
| Aqueous dye solution 1 | | 50.0 | | | | | | | | |
| Aqueous dye solution 2 | | | | | | | | | | |
| Glycerin | 10.0 | 10.0 | 10.0 | 10.0 | 10.0 | 10.0 | 10.0 | 10.0 | 10.0 | 10.0 |
| Triethylene glycol | 6.0 | 6.0 | 6.0 | 6.0 | 6.0 | 6.0 | 6.0 | 6.0 | 6.0 | 6.0 |
| 2-pyrrolidone | | 5.0 | 5.0 | 5.0 | 5.0 | 5.0 | 5.0 | 5.0 | 5.0 | 5.0 |
| Compound represented by general formula (I) | 5.0 | | | | | | | | | |
| Surfynol 420 (4.0) | | | | | | | | | | |
| Surfynol 440 (8.0) | | | | 0.4 | | | | | | |
| Acetylenol E40 (8.8) | | | | | 0.6 | | | | | |
| Acetylenol E100 (13.2) | 0.8 | | 0.8 | | | | | | | 0.8 |
| Uniox G-450 (15.6) | | | | | | 1.2 | | | | |
| Acetylenol E300 (17.1) | | 1.2 | | | | | 1.2 | | | |
| NIKKOL BO50 (17.8) | | | | | | | | 1.2 | | |
| Uniox G-1200 (19.1) | | | | | | | | | 1.2 | |
| Ion-exchanged water | 28.2 | 27.8 | 28.2 | 28.6 | 28.4 | 27.8 | 27.8 | 27.8 | 27.8 | 28.2 |

TABLE 3

|  | Ink No. | | | | | | | | |
|---|---|---|---|---|---|---|---|---|---|
|  | 21 | 22 | 23 | 24 | 25 | 26 | 27 | 28 | 29 |
| Pigment dispersion liquid 1 | | | | | | | | 50.0 | |
| Pigment dispersion liquid 2 | | | | | | | | | |
| Pigment dispersion liquid 3 | | | | | | 50.0 | | | 50.0 |
| Pigment dispersion liquid 4 | | | | | | | | | |
| Pigment dispersion liquid 5 | 50.0 | | | | | | | | |
| Pigment dispersion liquid 6 | | | | | | | | | |
| Pigment dispersion liquid 7 | | 50.0 | | | | | | | |
| Pigment dispersion liquid 8 | | | 50.0 | | | | | | |
| Pigment dispersion liquid 9 | | | | 50.0 | | | | | |
| Aqueous dye solution 1 | | | | | 50.0 | | 50.0 | | |
| Aqueous dye solution 2 | | | | | | | | | |
| Glycerin | 10.0 | 10.0 | 10.0 | 10.0 | 10.0 | 10.0 | 10.0 | 10.0 | 10.0 |
| Triethylene glycol | 6.0 | 6.0 | 6.0 | 6.0 | 6.0 | 6.0 | 6.0 | 6.0 | 6.0 |
| 2-pyrrolidone | 5.0 | 5.0 | 5.0 | 5.0 | 5.0 | | 5.0 | 5.0 | 5.0 |
| Compound represented by general formula (I) | | | | | | 5.0 | | | |
| Surfynol 420 (4.0) | | | | | | | | 0.4 | 0.4 |
| Surfynol 440 (8.0) | | | | | | | | | |
| Acetylenol E40 (8.8) | | | | | | | | | |

TABLE 3-continued

|  | Ink No. | | | | | | | | |
| --- | --- | --- | --- | --- | --- | --- | --- | --- | --- |
|  | 21 | 22 | 23 | 24 | 25 | 26 | 27 | 28 | 29 |
| Acetylenol E100 (13.2) | 0.8 | 0.8 | 0.8 | 0.8 | 0.8 | 0.8 | | | |
| Uniox G-450 (15.6) | | | | | | | | | |
| Acetylenol E300 (17.1) | | | | | | | 1.2 | | |
| NIKKOL BO50 (17.8) | | | | | | | | | |
| Uniox G-1200 (19.1) | | | | | | | | | |
| Ion-exchanged water | 28.2 | 28.2 | 28.2 | 28.2 | 28.2 | 28.2 | 27.8 | 28.6 | 28.6 |

<Evaluation>

For evaluation, a main tank, a sub tank, and a recording head illustrated in FIG. 2 were installed in an ink jet recording apparatus including a main portion illustrated in FIG. 1. The sub tank included a thermoplastic resin housing bonded to a recording element substrate, which included a recording head for ejecting ink by thermal energy. Tables 4 to 6 list the maximum ink storage amount of the main tank ("Storage amount of main tank $V_1$") and the maximum ink storage amount of the sub tank ("Storage amount of sub tank $V_2$"). The main tank was filled with the ink up to 95% of the maximum ink storage amount.

Tables 4 to 6 list the temperature of the ink in the main tank ("Ink temperature of main tank $T_1$") and the temperature of the ink in the sub tank ("Ink temperature of sub tank $T_2$"). More specifically, the temperature of the ink was adjusted as described below. First, the temperature of the ink in the main tank was adjusted by the temperature setting of the evaluation environment. The temperature of the ink in the sub tank was then adjusted as described below. In the case of $T_2 > T_1$, the temperature of the ink in the sub tank was adjusted by utilizing thermal energy of the recording head bonded to the housing of the sub tank. In the case of $T_2 = T_1$, the temperature of the ink in the sub tank was adjusted by the temperature setting of the evaluation environment in the same manner as in the main tank. In the case of $T_2 < T_1$, the temperature of the ink in the sub tank was adjusted with a cooling unit disposed outside the main tank.

In the present Examples, the recording duty of a solid image recorded with two ink droplets per unit area of 1/600 inches×1/600 inches was defined as 100%. Each of the droplets had a mass of 5 ng. A solid image was recorded at a recording duty of 5% over the entire surface of ten A4-size plain paper copier (PPC) paper sheets ("GF-500" (trade name), manufactured by CANON KABUSHIKI KAISHA).

After one hour rest, a nozzle check pattern was recorded. This operation cycle was repeatedly performed.

After the solid image was recorded on a predetermined number of sheets, the nozzle check pattern was visually inspected. The ejection properties were rated according to the following evaluation criteria. In the present invention, the ratings "AAA", "AA", "A", and "B" were acceptable, and "C" was unacceptable. Tables 4 to 6 show the evaluation results.

In the evaluation, the number of recorded sheets was increased to extend the elapsed time from the beginning of the evaluation. This is because a long contact time between the ink in the main tank and air tends to result in an increased amount of dissolved gas in the ink in the main tank. After recording on a predetermined number of sheets, the dissolved oxygen content of the ink measured as described above ranged from 5 to 7 mg/L, which was higher than the initial dissolved oxygen content (2 mg/L or less). Observation of no irregularities in the nozzle check pattern even after recording on a large number of sheets indicates that the present invention can prevent degradation in ejection properties due to bubbles. In contrast, irregularities in the nozzle check pattern indicate that an increased amount of dissolved gas in the ink results in bubbles in the ink passage of the recording head and impeded normal ink ejection due to the bubbles.

AAA: Few irregularities were observed in the nozzle check pattern after the solid image was recorded on 5,000 sheets.
AA: A few irregularities were observed in the nozzle check pattern after the solid image was recorded on 4,000 sheets.
A: A few irregularities were observed in the nozzle check pattern after the solid image was recorded on 2,000 sheets.
B: A few irregularities were observed in the nozzle check pattern after the solid image was recorded on 1,000 sheets.
C: Many irregularities were observed in the nozzle check pattern after the solid image was recorded on 500 sheets.

TABLE 4

| | | Ink No. | Storage amount of main tank $V_1$ (mL) | Storage amount of sub tank $V_2$ (mL) | $V_1/V_2$ ratio (times) | Ink temperature of main tank $T_1$ (° C.) | Ink temperature of sub tank $T_2$ (° C.) | $T_2 - T_1$ (° C.) | Evaluation results (ejection properties) |
| --- | --- | --- | --- | --- | --- | --- | --- | --- | --- |
| Example | 1 | 1 | 90.0 | 18.0 | 5.0 | 20 | 35 | 15 | AAA |
| | 2 | 1 | 100.0 | 20.0 | 5.0 | 20 | 35 | 15 | AAA |
| | 3 | 1 | 160.0 | 20.0 | 8.0 | 20 | 35 | 15 | AAA |
| | 4 | 1 | 90.0 | 30.0 | 3.0 | 20 | 35 | 15 | AA |
| | 5 | 1 | 90.0 | 9.0 | 10.0 | 20 | 35 | 15 | AAA |
| | 6 | 1 | 90.0 | 2.25 | 40.0 | 20 | 35 | 15 | AAA |
| | 7 | 1 | 90.0 | 2.2 | 40.9 | 20 | 35 | 15 | AA |
| | 8 | 1 | 90.0 | 1.8 | 50.0 | 20 | 35 | 15 | AA |
| | 9 | 1 | 90.0 | 18.0 | 5.0 | 20 | 23 | 3 | A |
| | 10 | 1 | 90.0 | 18.0 | 5.0 | 20 | 25 | 5 | AAA |
| | 11 | 1 | 90.0 | 18.0 | 5.0 | 25 | 40 | 15 | AAA |
| | 12 | 1 | 90.0 | 18.0 | 5.0 | 30 | 45 | 15 | AAA |
| | 13 | 1 | 90.0 | 18.0 | 5.0 | 15 | 45 | 30 | AAA |
| | 14 | 2 | 90.0 | 18.0 | 5.0 | 20 | 35 | 15 | AAA |

TABLE 4-continued

| | Ink No. | Storage amount of main tank $V_1$ (mL) | Storage amount of sub tank $V_2$ (mL) | $V_1/V_2$ ratio (times) | Ink temperature of main tank $T_1$ (° C.) | Ink temperature of sub tank $T_2$ (° C.) | $T_2 - T_1$ (° C.) | Evaluation results (ejection properties) |
|---|---|---|---|---|---|---|---|---|
| 15 | 3 | 90.0 | 18.0 | 5.0 | 20 | 35 | 15 | AAA |
| 16 | 4 | 90.0 | 18.0 | 5.0 | 20 | 35 | 15 | AAA |
| 17 | 5 | 90.0 | 18.0 | 5.0 | 20 | 35 | 15 | AAA |
| 18 | 6 | 90.0 | 18.0 | 5.0 | 20 | 35 | 15 | AA |
| 19 | 7 | 90.0 | 18.0 | 5.0 | 20 | 35 | 15 | AAA |
| 20 | 8 | 90.0 | 18.0 | 5.0 | 20 | 35 | 15 | AA |
| 21 | 9 | 90.0 | 18.0 | 5.0 | 20 | 35 | 15 | AA |
| 22 | 10 | 90.0 | 18.0 | 5.0 | 30 | 45 | 15 | A |
| 23 | 11 | 90.0 | 18.0 | 5.0 | 20 | 35 | 15 | AAA |
| 24 | 12 | 90.0 | 1.8 | 50.0 | 20 | 23 | 3 | B |
| 25 | 12 | 90.0 | 30.0 | 3.0 | 20 | 23 | 3 | B |

TABLE 5

| | | Ink No. | Storage amount of main tank $V_1$ (mL) | Storage amount of sub tank $V_2$ (mL) | $V_1/V_2$ ratio (times) | Ink temperature of main tank $T_1$ (° C.) | Ink temperature of sub tank $T_2$ (° C.) | $T_2 - T_1$ (° C.) | Evaluation results (ejection properties) |
|---|---|---|---|---|---|---|---|---|---|
| Example | 26 | 13 | 90.0 | 9.0 | 10.0 | 20 | 35 | 15 | AAA |
| | 27 | 13 | 60.0 | 6.0 | 10.0 | 20 | 35 | 15 | AAA |
| | 28 | 13 | 80.0 | 12.0 | 6.7 | 20 | 35 | 15 | AAA |
| | 29 | 13 | 90.0 | 30.0 | 3.0 | 20 | 35 | 15 | AA |
| | 30 | 13 | 90.0 | 18.0 | 5.0 | 20 | 35 | 15 | AAA |
| | 31 | 13 | 90.0 | 2.25 | 40.0 | 20 | 35 | 15 | AAA |
| | 32 | 13 | 90.0 | 2.0 | 45.0 | 20 | 35 | 15 | AA |
| | 33 | 13 | 90.0 | 1.8 | 50.0 | 20 | 35 | 15 | AA |
| | 34 | 13 | 90.0 | 9.0 | 10.0 | 20 | 23 | 3 | A |
| | 35 | 13 | 90.0 | 9.0 | 10.0 | 20 | 25 | 5 | AAA |
| | 36 | 13 | 90.0 | 9.0 | 10.0 | 25 | 40 | 15 | AAA |
| | 37 | 13 | 90.0 | 9.0 | 10.0 | 30 | 45 | 15 | AAA |
| | 38 | 13 | 90.0 | 9.0 | 10.0 | 15 | 45 | 30 | AAA |
| | 39 | 14 | 90.0 | 9.0 | 10.0 | 20 | 35 | 15 | AAA |
| | 40 | 15 | 90.0 | 9.0 | 10.0 | 20 | 35 | 15 | AAA |
| | 41 | 16 | 90.0 | 9.0 | 10.0 | 20 | 35 | 15 | AAA |
| | 42 | 17 | 90.0 | 9.0 | 10.0 | 20 | 35 | 15 | AAA |
| | 43 | 18 | 90.0 | 9.0 | 10.0 | 20 | 35 | 15 | AA |
| | 44 | 19 | 90.0 | 9.0 | 10.0 | 20 | 35 | 15 | AAA |
| | 45 | 20 | 90.0 | 9.0 | 10.0 | 20 | 35 | 15 | AAA |
| | 46 | 21 | 90.0 | 9.0 | 10.0 | 20 | 35 | 15 | AAA |
| | 47 | 22 | 90.0 | 9.0 | 10.0 | 20 | 35 | 15 | AA |
| | 48 | 23 | 90.0 | 9.0 | 10.0 | 20 | 35 | 15 | AA |
| | 49 | 24 | 90.0 | 9.0 | 10.0 | 20 | 35 | 15 | AA |
| | 50 | 25 | 90.0 | 9.0 | 10.0 | 20 | 35 | 15 | A |
| | 51 | 26 | 90.0 | 9.0 | 10.0 | 20 | 35 | 15 | AAA |
| | 52 | 27 | 90.0 | 1.8 | 50.0 | 20 | 23 | 3 | B |
| | 53 | 27 | 90.0 | 30.0 | 3.0 | 20 | 23 | 3 | B |

TABLE 6

| | | Ink No. | Storage amount of main tank $V_1$ (mL) | Storage amount of sub tank $V_2$ (mL) | $V_1/V_2$ ratio (times) | Ink temperature of main tank $T_1$ (° C.) | Ink temperature of sub tank $T_2$ (° C.) | $T_2 - T_1$ (° C.) | Evaluation results (ejection properties) |
|---|---|---|---|---|---|---|---|---|---|
| Comparative | 1 | 28 | 90.0 | 18.0 | 5.0 | 20 | 35 | 15 | C |
| Example | 2 | 29 | 90.0 | 9.0 | 10.0 | 20 | 35 | 15 | C |
| | 3 | 1 | 90.0 | 18.0 | 5.0 | 20 | 20 | 0 | C |
| | 4 | 1 | 90.0 | 18.0 | 5.0 | 25 | 20 | −5 | C |
| | 5 | 13 | 90.0 | 9.0 | 10.0 | 20 | 20 | 0 | C |
| | 6 | 13 | 90.0 | 9.0 | 10.0 | 25 | 20 | −5 | C |
| | 7 | 1 | 90.0 | 45.0 | 2.0 | 20 | 35 | 15 | — |
| | 8 | 1 | 90.0 | 0.9 | 100.0 | 20 | 35 | 15 | — |

Example 20 was superior to Example 21, Example 23 was superior to Example 1. Example 51 was superior to Example 26. In Comparative Example 7, a large amount of ink in the sub tank resulted in a high load on the recording head carriage, thus failing to record the image on the predetermined number of sheets. In Comparative Example 8, a small amount of ink in the sub tank resulted in frequent ink supply from the main tank to the sub tank and an impractically low recording speed.

The present invention can provide an ink jet recording method having good ejection properties even after ink ejection for extended periods using a recording apparatus. The recording apparatus includes a main tank having an air communication part and a sub tank. The ink storage amount of the main tank and the ink storage amount of the sub tank have a specific ratio. The present invention can also provide an ink jet recording apparatus suitable for the ink jet recording method.

While the present invention has been described with reference to examples, it is to be understood that the invention is not limited to the disclosed examples. The scope of the following claims is to be accorded the broadest interpretation so as to encompass all such modifications and equivalent structures and functions.

This application claims the benefit of Japanese Patent Application No. 2015-114030 filed Jun. 4, 2015 and No. 2015-114031 filed Jun. 4, 2015, which are hereby incorporated by reference herein in their entirety.

What is claimed is:

1. An ink jet recording method comprising:
   ejecting an aqueous ink from a recording head to record an image on a recording medium using an ink jet recording apparatus, the ink jet recording apparatus comprising:
      a first ink storage portion having an air communication part;
      a second ink storage portion; and
      a recording head,
   wherein the first ink storage portion has a maximum ink storage amount (V1) 3.0 or more to 8.0 or less times larger than a maximum ink storage amount ($V_2$) of the second ink storage portion, and the ink in the second ink storage portion has a temperature ($T_2$) higher than a temperature ($T_1$) of the ink in the first ink storage portion,
   wherein the aqueous ink contains a coloring material and a surfactant having a hydrophilic-lipophilic balance (HLB) of 8.0 or more and 19.5 or less,
   wherein the ink jet recording apparatus is free from pressure control between the first ink storage portion and the second ink storage portion, and
   wherein the temperature (T1) is 5 C or more to 40 C or less and the temperature ($T_2$) is 10 C or more to 50 C or less.

2. The ink jet recording method according to claim 1, wherein $T_2$ and $T_1$ have a difference of 5 or more.

3. The ink jet recording method according to claim 1, wherein the surfactant is at least one of an ethylene oxide adduct of acetylene glycol and an ethylene oxide adduct of glycerin.

4. The ink jet recording method according to claim 1, wherein the coloring material includes a pigment.

5. The ink jet recording method according to claim 1, wherein the aqueous ink further contains a compound represented by the following general formula (I):

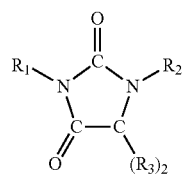

wherein $R_1$ and $R_2$ each independently represents a hydrogen atom or a hydroxyalkyl group, and each $R_3$ independently represents a hydrogen atom or an alkyl group.

6. The ink jet recording method according to claim 1, wherein the HLB is 18.0 or less.

7. The ink jet recording method according to claim 1, wherein $T_2$ and $T_1$ have a difference of 5 or more to 30 or less.

8. The ink jet recording method according to claim 1, wherein a surfactant content of the aqueous ink is 0.1% or more to 5.0% or less by mass of the total mass of the aqueous ink.

9. The ink jet recording method according to claim 1, wherein the maximum ink storage amount ($V_1$) is 60.0 mL or more to 200.0 mL or less and the maximum ink storage amount ($V_2$) is 1.0 mL or more to 35.0 mL or less.

10. The ink jet recording method according to claim 1, wherein the air communication part is in communication with the ink in the first storage portion.

11. The ink jet recording method according to claim 1, wherein the ink is supplied from the first ink storage portion to the second ink storage portion through an ink supply tube and is ejected from ejection ports of the recording head.

12. The ink jet recording method according to claim 1, wherein the ink jet recording apparatus is a serial type.

13. The ink jet recording method according to claim 4, wherein the pigment is a self-dispersible pigment.

14. The ink jet recording method according to claim 12, wherein the recording head is bonded to the second ink storage portion.

15. The ink jet recording method according to claim 14, wherein the second ink storage portion is a housing made of a thermoplastic resin, and
   wherein a recording element substrate including the recording head is directly bonded to the second ink storage portion.

16. An ink jet recording apparatus comprising:
   a first ink storage portion having an air communication part;
   a second ink storage portion; and
   a recording head,
   wherein the first ink storage portion has a maximum ink storage amount (V1) 3.0 or more to 8.0 or less times larger than a maximum ink storage amount ($V_2$) of the second ink storage portion, and the ink in the second ink storage portion has a temperature ($T_2$) higher than a temperature (T1) of the ink in the first ink storage portion,
   the aqueous ink contains a coloring material and a surfactant having a hydrophilic-lipophilic balance (HLB) of 8.0 or more and 19.5 or less,
   wherein the ink jet recording apparatus is free from pressure control between the first ink storage portion and the second ink storage portion, and
   wherein the temperature (T1) is 5 C or more to 40 C or less and the temperature ($T_2$) is 10 C or more to 50 C or less.

* * * * *